United States Patent
Mimura et al.

(10) Patent No.: US 6,847,613 B2
(45) Date of Patent: Jan. 25, 2005

(54) METHOD OF MONITORING QUALITY OF COMMUNICATION FOR EACH FLOW

(75) Inventors: Itaru Mimura, Sayama (JP); Mitsuru Nagasaka, Kokubunji (JP); Noboru Endo, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 835 days.

(21) Appl. No.: 09/803,009

(22) Filed: Mar. 12, 2001

(65) Prior Publication Data

US 2001/0021176 A1 Sep. 13, 2001

(30) Foreign Application Priority Data

Mar. 13, 2000 (JP) ........................................ 2000-073924

(51) Int. Cl.[7] ............................................. H04L 12/28
(52) U.S. Cl. ........................ 370/235; 370/389; 709/225
(58) Field of Search ................................ 370/229, 235, 370/389, 396, 400, 401; 709/224

(56) References Cited

U.S. PATENT DOCUMENTS 6,615,262 B2 * 9/2003 Schweitzer et al. ......... 709/224

* cited by examiner

Primary Examiner—Douglas Olms
Assistant Examiner—Robert W. Wilson
(74) Attorney, Agent, or Firm—Mattingly, Stanger & Malur, P.C.

(57) ABSTRACT

A packet switch identifies a communication flow carried across an IP network, observes the communication flow, and acquires statistics data thereof, such as the number of packets that passed through the switch, the number of discarded packets, time at which the packets arrived at the switch, and time at which the packets were sent out from the switch. The packet switch continues to acquire the statistics data on the communication flow while the communication flow continues. If the packet switch performs a relay function, it sends the locally obtained statistics data to the adjoining packet switch placed downstream. If the packet switch is a node placed on either end edge of the network, it gathers the statistics data obtained by and delivered from other switches in the network and sends the gathered statistics data to the network management system.

16 Claims, 7 Drawing Sheets

METHOD OF MONITORING QUALITY OF COMMUNICATION FOR EACH FLOW

BACKGROUND OF THE INVENTION

1. Field of the Invention

The present invention relates to a method of monitoring communication flows carried across a network and hardware that implements monitoring, using such method. Particularly, the invention relates to such network monitoring method and hardware intended for efficiently collecting and analyzing the statistics data on packets per communication flow transmitted across a network that provides packet switching by using Internet Protocol (this network is hereinafter referred to as an IP network) in order to use such statistics data for charging and other administrative tasks.

2. Description of Related Art

Existing IP networks are administrated, based on a policy called a best effort: i.e., a network provides the best transmission performance that it can accomplish by using the maximum available resources for communication (for example, transmission bandwidth and delay time) in the network. As the IP networks conform to the best effort policy, the network provider does not practice the assurance of Quality of Service (QoS) indicated by, for example, a packet discard rate or packet transmission delay time measured for communication between terminals connected to the network. Therefore, it has not been implemented so far to monitor individual communication flow units (a data flow sent from a network user terminal and received at another network user terminal) and collect communication quality and related statistics data in the existing IP networks.

However, the role of the IP networks as general communications infrastructures has been established and communication services requiring a certain level of quality, such as sound/voice communications and visual communications across an IP network are prevailing. In this situation, a demand for the communication quality assurance in the IP networks is a growing tendency. The industry began to consider that common carriers charge users for IP network services provided by them, according to how much the user used what kind of service. In the above background, there are manifest demands for an IP network that ensures the quality of communication and for collecting statistics and transmission performance data used for confirming that the network actually provides services satisfying the quality of communication.

Monitoring traffic carried across a network and collecting statistics data thereof have so far been practiced, based on some technique of prior art, in order to promptly detect a congestion state and a fault occurring in the network, thus preparing the network for expanding its facilities and fault analysis. This traffic monitoring and statistics collection practice is such that items representing traffic particulars, such as the number of packets received, the count of bytes received, the number of packets transmitted, and the count of bytes transmitted are observed and measured per line interface on a packet switch (a router) for all packet switches that are components of a network, but communication quality per communication flow is not monitored. Statistics data obtained by observing the above items is stored into a Management Information Base (MIB) for storing management information, provided on each packet switch. Such a method of data collection is used that supervisory equipment existing in the network collects the information out of the MIB from all packet switches in the network and retains such information to be used for management.

With the demand for monitoring traffic per communication flow and collecting statistics data obtained by monitoring in the background, a few working groups of the Internet Engineering Task Force (IETF) are making study efforts to establish a method of measuring traffic carried across an IP network. According to the internet draft (draft-ietf-rtfm-architecture.txt) issued by the IETF, such measurement is taken by functional elements called meters 20 and 21 which are shown in FIG. 2, provided in the packet switches in the communication path. A functional element called a meter reader 22 collects the measurements taken by the meters 20 and 21. The monitoring system is architectured such that all packet switches as the components of the network are equipped with a meter, monitor communication flows, and acquire statistics data thereof. Network management equipment called a manager 23 performs the function of controlling the meters 20 and 21 and the meter reader 22. The statistics data on transmission performance collected by the meter reader 22 is analyzed by application software installed on the meter reader 22.

When an IP packet arrives at the meter 20, the meter 20 checks to see whether the IP packet matches any of the pre-registered communication flow conditions. A communication flow to which the IP packet belongs is identified by the match between the data, for example, source and destination IP addresses specified in the packet header and those pre-registered as the condition of the communication flow.

If such data existing in the header does not match any condition of communication flow, the meter 20 allows the IP packet to pass without executing any processing. If such data matches a communication flow condition, the meter 20 handles the packet, according to predetermined handling. Typically, handling is either measuring or ignoring. In the case of ignoring, the meter allows the packet to pass as does for condition mismatch. In the case of measuring, the existing values of the measurement items (e.g., the number of packets passed and the count of bytes passed) stored in the area for the communication flow to which the packet belongs in the flow table are updated by adding the count of the new arrival packet. The flow table is attached to each of the meters 20 and 21. Match/mismatch with a certain condition of communication flow is judged per packet. According to the result of this judgment, communication flow monitoring is performed and statistics data thereof is acquired. In this way, it can be implemented to monitor traffic and acquire detailed statistics data for each communication flow. The measured data is stored in the form of MIB and the meter reader 22 accesses the MIB and reads the data. From the meter reader, the manager 23 and an upper-level network management system linked thereto collect such data and the data can be used for charging and other administrative tasks.

As described above, by providing the intra-IP-network packet switches with the traffic measurement function and providing the network management equipment with the statistics collection function, monitoring of the communication flows that pass across the network is implemented.

SUMMARY OF THE INVENTION

With the increase of the number of packet switches as components of the IP network to which the conventional traffic monitoring and statistics collection technique described above is applied, that is, as the IP network expands, the following problems arise:

(1) If a large IP network is made up of many packet switches as will be shown in FIG. 4, the meter reader of the network management system must communicate with these many packet switches to collect the statistics data obtained by monitoring. Consequently, a problem arises that the intra-IP-network traffic increases. Because packets sent from the edge nodes placed on the edges of the IP network are concentrated in the core of the IP network, such traffic increase causes a bottleneck of core network performance.

(2) If the network manager and meter reader accommodate many packet switches to be managed, the processing load of the meter reader becomes heavy. Another problem is that the performance of the network management system must be improved as the network expands.

(3) For charging per call (communication flow), measured data such as the number of packets in which a session is completed and indicators of the quality of communication, based on which the charge is determined (e.g., the number of packets received and the count of bytes received on a switch that receive packets from the sending-end terminal as well as the number of packets transmitted and the count of bytes transmitted on a switch that transmits packets to the receiving-end terminal) must be collected per call (communication flow). Because storing the statistics data obtained by monitoring is separately performed on each packet switch, different data for even a same call (communication flow) is collected, according to the conventional monitoring traffic and statistics collection method. Because each packet switch generally operates, based on different time information (clock), it is very difficult to analyze the collected statistics data in terms of time sequence and causation. Even if, for example, the meter reader starts to collect the statistics data from the meters simultaneously, it must sequentially access the meters operating with different clocks. Consequently, a problem of time inconsistency of the statistics data collected from the packet switches arises.

(4) According to the conventional technique, the meter reader sends a request to the meters for collecting the statistics data obtained by monitoring. Another problem is increased traffic by this request, as this traffic becomes considerable if the meter reader does so per call (communication flow). The meter reader must arrange the received statistics data from all meters on a call-by-call basis and generate data that is the basis for charging. This puts a great deal of processing load on the meter reader and makes it difficult for a large-scale network to collect statistics data obtained by monitoring per call (communication flow) for charging. Especially, for a large-scale IP network across which many communication flows pass, wherein the carrier will provide services on the basis of per-call (per-communication-flow) charging like voice communication in future, the above problems will become more manifest.

Recently, assurance of communications performance and quality by Service Level Agreement (SLA) has been viewed as a business means for Internet Service Providers (ISPs) The SLA defines the availability of network resources (e.g. bandwidth), delay time, and fault information (maintenance time). In addition, minimum bandwidth within which reliable transmission is guaranteed and a packet loss rate can be defined in the SLA. If the ISP contravenes the SLA as contracted, the ISP must compensate for the user under contract with the ISP. Thus, it is important for the ISP to prove the fulfillment of the SLA to the user as well as administrate its network without contravening the SLA. If the ISP provides a traffic monitoring service that comprises monitoring communication service per communication flow for the user whom the ISP contracted for SLA and presenting the result data obtained by monitoring to the user, thereby proving the fulfillment of the SLA, its reliability for the user can be enhanced and this will be beneficial for the business.

An object of the present invention is to provide network monitoring method and hardware expandable with low cost and suitable for collecting traffic statistics data from the meters that observe calls (communication flows) and measure such data per call (communication flow), which is applicable to a large-scale IP network.

A typical method of monitoring traffic (communication flows) to pass across an underlying network is outlined below.

A plurality of packet switches connected to the underlying network to route and monitor (observe) traffic passing across the network are furnished with a means of management of IP packets to be monitored. This means maps a type of IP packets constituting a communication flow to be monitored to a monitoring method applied to the IP packets and the items to be measured for the IP packets. When a sending-end packet switch placed on one end boundary of the network receives an IP packet that belongs to a new communication flow (hereinafter referred to as a new IP packet), it identifies what type of the new IP packet and determines the monitoring method applied to the identified new IP packet and the items to be measured by using the above means of management of IP packets to be monitored. The sending-end packet switch monitors the new IP packet and subsequent packets, according to the thus determined monitoring method, and measures the predetermined items. At the same time, the sending-end packet switch forwards the new IP packet and subsequent packets to a core packet switch, based on the routing information held by that packet switch. In the same manner as the sending-end packet switch does, the core packet switch identifies what type of the new IP packet and determines the monitoring method applied to the identified new IP packet and the items to be observed (measured) by using the above means of management of IP packets to be monitored. The core packet switch monitors the new IP packet and subsequent packets, according to the thus determined monitoring method, and measures the predetermined items. At the same time, the core packet switch forwards the new IP packet and subsequent packets to a receiving-end packet switch placed on the other end boundary of the network. Similarly, the receiving-end packet switch identifies what type of the new IP packet and determines the monitoring method applied to the identified new IP packet and the items to be observed (measured) by using the above means of management of IP packets to be monitored. The core packet switch monitors the new IP packet and subsequent packets, according to the thus determined monitoring method, and measures the predetermined items.

On the occasion of detecting the disconnection of the communication flow (session), the sending-end packet switch generates a packet of request for statistics data obtained by monitoring and transfers it to the adjoining core packet switch placed downstream. When receiving this packet, the core packet switch stores the statistics obtained by it into that packet (adds them to the statistics obtained and stored by the preceding packet switch) and transfers the packet to the adjoining packet switch placed downstream. When the receiving-end packet switch receives the above packet containing the statistics obtained and stored by the preceding packet switches from the adjacent core packet switch placed upstream, it additionally stores the statistics obtained by it into that packet, and generates a notification packet containing the statistics data obtained by monitoring and transfers this packet to the network management system that administrates all the above packet switches.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

How the invention can be embodied will be explained below with reference to the drawings.

Figure 1:
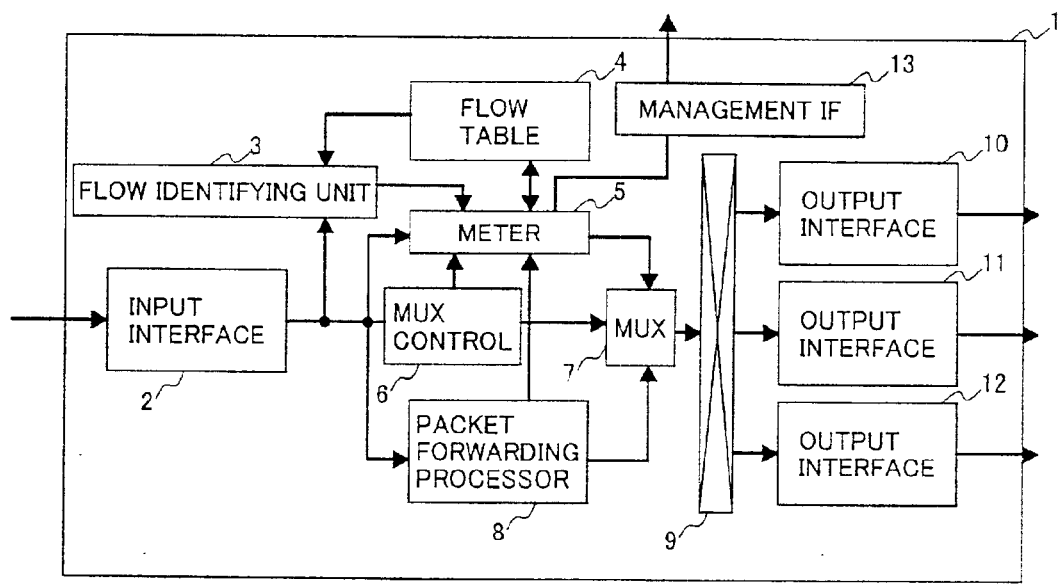
FIG. 1 is a block diagram of a packet switch that is provided with a monitoring feature, according to the monitoring method of the present invention.

FIG. 1 is a block diagram showing the configuration of a packet switch that implements monitoring communication flows and collecting statistics data thereof, according to the method of the present invention. A packet switch 1 comprises an input interface (hereinafter referred to as an input IF) 2, a flow identifying unit 3, an packet forwarding processor 8, MUX control 6, a meter 5, a flow table 4, a management interface (hereinafter referred to as management IF) 13, multiplexer 7, a switch 9, and a plurality of output interfaces (hereinafter referred to as output IFs) 10, 11, and 12. Although practical packet switches generally perform two-way transmission operation with input and output IF pairs, the discussion herein focuses on only one-way packet forwarding for easy understanding of the method of the present invention.

How the packet switch 1 operates will be now explained. IP packets from an adjoining packet switch (not show) are input to the input IF 2. The input IF 2 delivers the IP packets to the flow identifying unit 3, meter 5, MUX control 6, and packet forwarding processor 8.

The flow identifying unit 3 receives the IP packets delivered from the input IF 2 and identifies a flow that the IP packets constitute by using the information contained in the header of the packets. Conditions for identifying communication flows are assumed to have been registered in the flow table 4 beforehand. The conditions for communication flow identification stored in the flow table 4 are set by using combinations of information items contained in the IP address header, such as Source IP Address (SIP), Destination IP Address (DIP), Protocol Type (PT), Service Type (ST) (alternatively, DS (Differentiated Service) field as termed by The Differentiated Service working group of the IETF), and packet length. In addition, Source Port Number and Destination Port Number defined in UDP and TCP layers which are upper than the IP layer may be used. Although communication flow identification by using identifier information defined in upper protocol layers than the IP layer was described up to here, this identification is possible by using header information (Shim header information) defined in layers used in a Multi Protocol Label Switching (MPLS) scheme for which the IETF is lately making efforts toward standardization. Furthermore, if Asynchronous Transfer Mode (ATM) is used as the transmission protocol, flow identifiers such as Virtual Circuit (VC) and Virtual Path (VP) identifiers existing in the ATM header may be used. By looking up a condition matching with the information contained in the header of the incoming IP packets in the flow table 4 that contains the conditions for communication flow identification, the communication flow that the IP packets constitute can be identified. A strong point of the present invention comprises identifying a communicating flow meeting the condition for identifying it, collecting statistics data obtained by monitoring the communication flow, and sending the information to an adjoining packet switch placed downstream in the route across which the communication flow is passing. It is easily understandable that a search key comprising any information items can be applied if available for communication flow identification.

The meter 5 measures predetermined items such as counting the number of packets meeting one of the conditions for communication flow identification, counting the number of bytes, etc. and retains these measurements as statistics data obtained by monitoring. If incoming IP packets constitute a communication flow that does not meet any condition for communication flow identification, these packets are only forwarded to their destination, but does not undergo the monitoring and statistics collection. Monitoring packets and statistics collection will be detailed later.

The packet forwarding processor 8 executes packet forwarding of incoming packets in the same way as normal packet switching hardware does. Specifically, the packet forwarding processor 8 executes IP routing: it reads the destination IP address of a sequence of incoming packets; consults the routing table held by it and looks up a next-hop packet switch for routing the packets to the destination IP address, according to the pre-registered forwarding and routing information in the table; and delivers the packets to the output IF (one of the output IFs 10, 11, and 12) connected to the next-hop packet switch. In practice, the packet forwarding processor 8 controls the switch 9 so that the switch 9 will deliver the IP packets to the output IF.

Now, the meter 5 will be explained in detail. The meter 5 provides the function of observing incoming IP packets and acquiring statistics data thereof. If incoming packets belong to a communication flow to be monitored, meeting one of the conditions for flow identification, as instructed by the flow identifying unit 3, the meter observes the incoming packets and acquires and retains statistics thereof. Statistical items to be measured include: the total number of packets passed across the packet forwarding processor; the count of the bytes for each of these packets; the number of packets passed per unit time, traffic-related items such as the count of the bytes of the packets passed per unit time; the total number of packets discarded by the packet forwarding processor without passing; the number of packets discarded per unit time and the count of the bytes of these packets; the maximum, minimum, and average numbers of packets passed per unit time, analyzed in time steps; each count of the bytes for the above maximum, minimum, and average numbers of the packets. It is advisable to set statistical items to be measured as those relevant to the arrangements specified by the service provider's contract with a user for quality assurance. The number of packets passed and the count of the bytes of the packets are required for meter rate charging. The number of lost packets represents the quality level of communication. The maximum number of packets passed and related byte count, the average number of packets passed and related byte count, and the minimum number of packets passed and related byte count are used to verify that the communication flow meets the condition of the class of contract. The meter 5 also detects relative time at which the transmission of the communication flow consisting of the observed IP packets begins and relative time at which that communication flow terminates. How the meter detects the communication flow start time and end time will be explained later with the function of the MUX control 6. These time measurements are used for calculating how long the packets stay in the packet switch after input to it; namely, delay time is calculated as part of the statistics data.

As the meter 5 observes the packets constituting a communication flow, it retains the acquired statistics data for the flow as well as the condition of identifying the flow as registered in the flow table 4. According to the instruction of the MUX control 6, the above data is incorporated into the communication flow consisting of the packets to be delivered to one of the output IFs (10, 11, and 12) and sent as part of the flow. The occasion of incorporating the statistics data into the communication flow under the control of the MUX control 6 is receiving a packet of the command to start collecting the statistics data obtained by monitoring from the adjoining packet switch placed upstream of the packet switch 1. As soon as the packet switch 1 receives this packet of the command to start collecting the statistics data, it incorporates the statistics data obtained by monitoring into the sequence of the IP packets of user data and sends. The MUX control 6 detects the reception of the packet of the command to start collecting the statistics data obtained by monitoring.

If the packet switch 1 is placed on the remote end boundary of the domain of the network under traffic observation, that is, it is an edge packet switch, it does not incorporate the statistics data obtained by monitoring into the communication flow, but delivers the statistics data measured and retained by its local meter together with the statistics data obtained by monitoring and sent from other packet switches to the management IF 13 which sends this data to the network management system. The edge packet switch thus sends the statistics data obtained by monitoring to the network management system instead of sending it to the adjoining packet switch placed downstream so that it can send the gathered statistics data obtained by monitoring in the domain of the network under traffic observation to the network management system.

In connection with the above operation, the packet switch finds whether it is placed on the remote end boundary of the network domain from the routing information sent from the adjoining packet switch placed upstream. How to generate the above packet of the command to start collecting the statistics data obtained by monitoring and how to generate a packet of the command to start monitoring and statistics acquisition will be described later.

Figure 2:
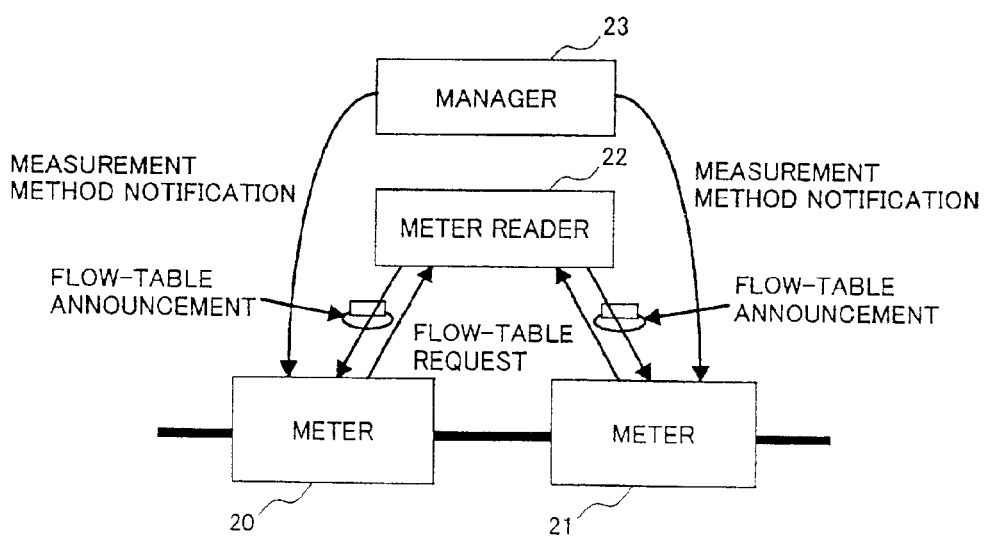
FIG. 2 is a schematic diagram illustrating the monitoring method of prior art.
Figure 3:
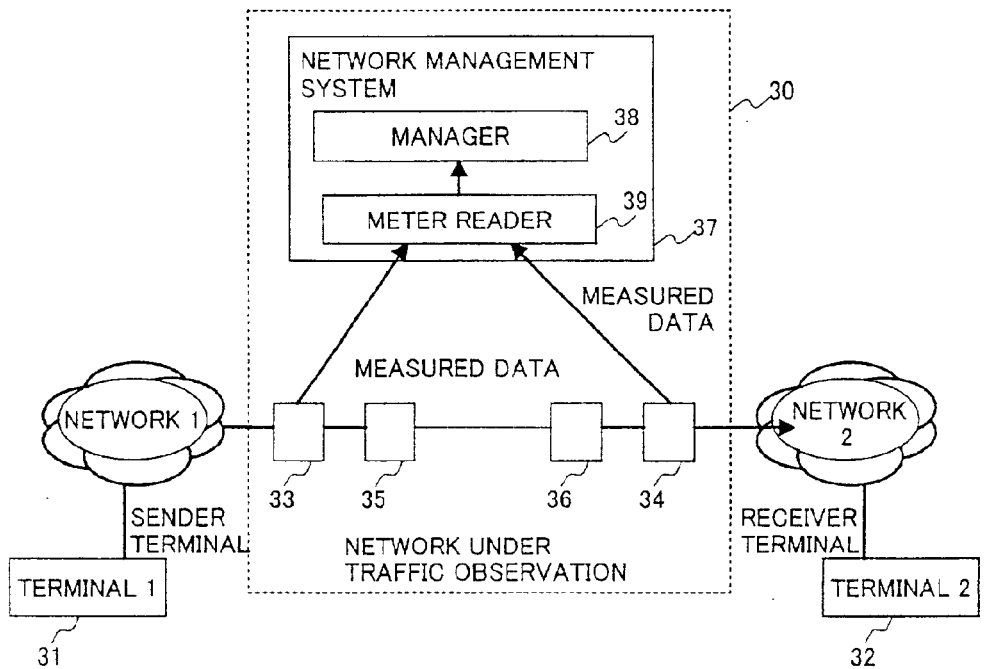
FIG. 3 is a network topology diagram regarding a first preferred embodiment of the present invention.
Figure 4:
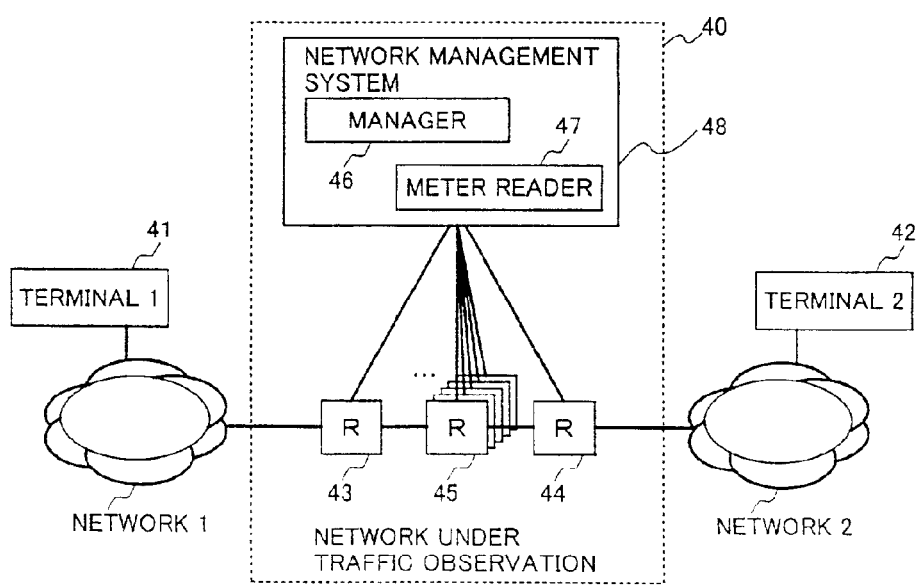
FIG. 4 is a network topology diagram wherein the monitoring method of prior art is used.

FIG. 3 is a schematic diagram showing the configuration of an IP network provided with the capability of traffic observation for acquiring statistics according to the present invention, wherein packet switches 1 as shown in FIG. 1 are used. Here, the domain of the network provided with the capability of traffic observation for acquiring statistics is represented as a network under traffic observation 30. The network under traffic observation 30 consists of packet switches 33, 34, 35, and 36, shown in FIG. 1, and a network management system 37. The network management system 37 is equipped with a meter reader 39 and a manager 38 as illustrated in FIG. 2. This network under traffic observation 30 is connected to external networks and relays packets from one external network to the other external network. The packet switches (33, 34) in the outermost position on either side, directly connected to either external network are called edge packet switches. In this network configuration to illustrate a preferred embodiment of the present invention, only the edge packet switches are connected to the network management system. Now, a case where one terminal 1 (31) communicates with another terminal 2 (32) and packet transmission monitoring operation thereof will be explained. In this case, the terminal 1 (31) is assumed to be a sender terminal and the terminal 2 (32) a receiver terminal. In the following, the monitoring operation will be explained on the assumption that the sender terminal side is upstream and the receiver terminal side is downstream. A communication flow from the sender terminal (terminal 1) 31 is transmitted across an external network 1 and arrives at the edge packet switch 33. If this flow is a new communication flow that is to be monitored, the edge packet switch 33 starts monitoring to acquire statistics on the communication flow and sends the adjoining packet switch 35 placed downstream the IP packets constituting the communication flow into which a packet of the command to start monitoring and statistics acquisition is incorporated. Upon the reception of the packet of the command to start monitoring and statistics acquisition, similarly the packet switch 35 starts monitoring to acquire statistics on the communication flow and relays the above packet to the adjoining packet switch placed downstream. In this way, all packet switches forming the route across which the communication flow is passing in this network under traffic observation receive the packet of the command to start monitoring and statistics acquisition. As a result, the action of monitoring and statistics acquisition begins along the route for carrying the communication flow. Because the packet switch 34 directly connected to another external network 2 is an edge packet switch, the packet of the command to start monitoring and statistics acquisition is terminated at this packet switch 34 so that it is not sent to a packet switch in the external network 2. While the communication flow between the sender terminal 31 and the receiver terminal 32 continues, all packet switches in the route for carrying the communication flow continue the monitoring to acquire statistics on the communication flow. When the communication flow from the sender terminal 31 terminates, the edge packet switch 33 detects the end of the flow and sends a packet of the command to collect the statistics data obtained by monitoring to the adjoining packet switch 35 placed downstream in the flow for carrying the communication flow. Upon the reception of the packet of the command to collect the statistics data obtained by monitoring, the downstream packet switch 35 reads the statistics data on the communication flow from its local meter as commanded, stores that data into an IP packet, sends this packet as well as the command packet to the adjoining packet switch placed further downstream. At the packet switch 34 connected in the most downstream place, the packet of the command to collect the statistics data obtained by monitoring and the IP packet containing multiplex statistics data obtained and stored by all upstream packet switches arrives. The edge packet switch 34 terminates the statistics on the communication flow by gathering all statistics data from the upstream and sends the gathered statistics data to the meter reader 39. Upon the reception of this data, the meter reader 39 analyzes the data such as the number of packets passed per packet switch and related byte count, the number of discarded packets and related byte count, and/or bandwidth usage. The greatest feature of the present invention is that the edge packet switch 34 sends a batch of the statistics data on the communication flow to the meter reader 39, but the invention does not specify how to analyze such data. It is possible to analyze the statistics data obtained by monitoring in different ways: e.g., an analysis method in which the data can be used for charging, converting the data into form in which the data can be used as communication quality assurance verification data, and so on. Any applicable method of analysis can be used. By the monitoring operation described above, all statistics data on the communication flow from the sender terminal 31 to the receiver terminal 32 can be obtained by monitoring along the route across which the flow passes and finally gathered on the edge packet switch 34. According to this operation, the finally gathered data is the statistics data obtained when each packet switch has received the packet of the command to collect the statistics data obtained by monitoring. This is noticeable advantage for assuring that time sequence of the statistics data obtained by monitoring is traceable.

According to the above description of the invention embodied as shown in FIG. 3, statistics data is gathered in sequence in which each packet switch receives the packet of the command to collect the statistics data obtained by monitoring. That is, the statistics data obtained by each switch is added to that data obtained by the upstream packet switch or switches and forwarded downstream and thus multiplexed data is finally gathered on the most downstream edge packet switch 34 from which the data is sent to the meter reader. However, it is also possible that the most downstream edge packet switch 34 detects the end of the communication flow and sends the packet of the command to collect the statistics data obtained by monitoring in the reverse (upstream) direction to the direction in the above description. In this case, from the downstream toward the upstream, the IP packet including the statistics data obtained by monitoring is sent. The packet containing the finally gathered statistics data is terminated at the edge packet switch 33 which is the nearest to the sender terminal 31 and from this switch, the statistic data obtained by monitoring and stored by all packets switches in the route is sent to the meter reader 39. The main point of the present invention is as follows. The packet switches along the route for carrying the communication flow store locally obtained statistics data by monitoring into a packet in order of their positions and the packet containing thus multiplexed statistics data is relayed to the edge packet switch (33 or 34) from which the finally gathered statistics data is sent to the meter reader. It is easily understandable that the direction toward which the above packet is passed may be either downstream or upstream as described above.

Although, in the embodiment of the invention shown in FIG. 3, the network under traffic observation 30 is connected to the external networks 1 and 2 and the sender and receiver terminals are not directly connected to the network wherein the present invention is implemented, these terminals may be directly connected to the network under traffic observation 30. This is implemented such that a packet switch to which the sender terminal is connected and a packet switch to the receiver terminal is connected operate as edge packet switches. Specifically, either of the edge terminals detects the start and end of the communication flow from the sender terminal and generates and sends out the packet of the command to start monitoring and statistics acquisition and the packet of the command to collect the statistics data obtained by monitoring.

The above-described operation will be explained in further detail by using FIGS. 5 and 6.

Figure 5:
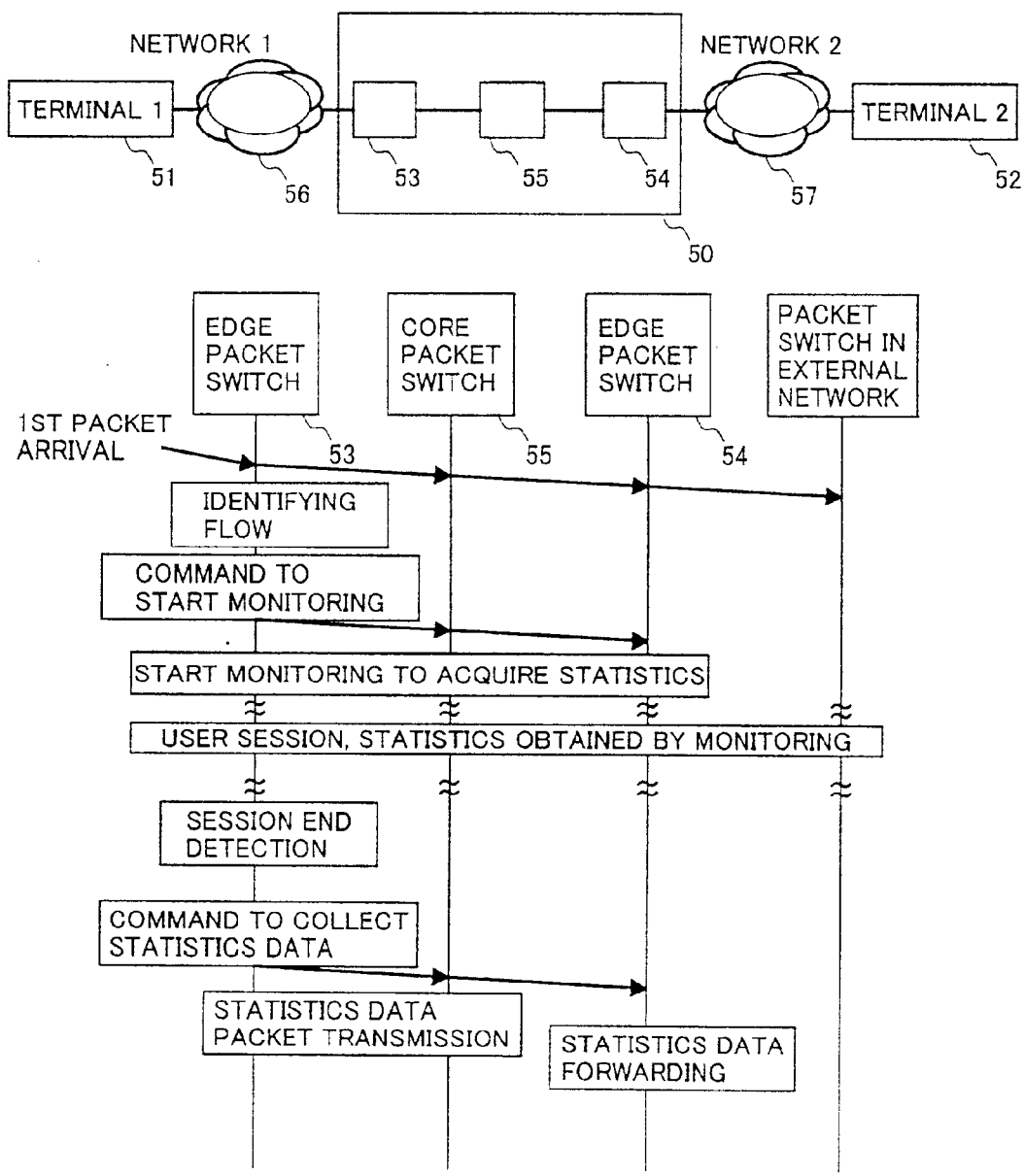
FIG. 5 is a diagram illustrating how the packet switches operate in the network (shown in FIG. 3) to which the preferred embodiment of the present invention is applied.

In FIG. 5, the same network topology diagram as shown in FIG. 3 is presented on the top and how the network components operate is illustrated in the lower part. In this representation, assume that time passes from top and bottom. In the topology shown in FIG. 5, the external network 1 (55), the network under traffic observation 50, and the external network 2 (57) provide the connection between the terminal 1 (51) and terminal 2 (52). In the network under traffic observation 50, the packet switches 53 and 54 are edge packet switches and the packet switch 55 is a core packet switch. When the terminal 1 begins communication, a first packet first arrives at the edge packet switch 53. The edge packet switch 53 forwards this packet to the core packet switch placed downstream. At the same time, the flow identifying unit 3 explained with reference to FIG. 1 identifies the communication flow that beings with this packet. If this flow is new and to be monitored, the edge packet switch 53 sends the packet of the command to start monitoring and statistics acquisition to the core packet switch 55 connected thereto downstream. The core packet switch 55 sends this packet of the command to start monitoring and statistics acquisition to a further downstream packet switch and the packet eventually arrives at the most downstream edge packet switch 54. Once having received this packet of the command to start monitoring and statistics acquisition, every packet switch starts monitoring of the communication flow and acquires statistics relevant to the flow. Of, course, every packet switch transmits the packets constituting the communication flow from the terminal 1 to the terminal 2 and provides user session communication. As explained with reference to FIG. 1, when the communication flow terminates, the edge packet switch 53 detects the disconnection of the session and sends the packet of the command to collect the statistics data obtained by monitoring to the core packet switch 55 placed downstream. At the same time, the edge packet switch 53 sends a packet including locally obtained statistics data to the downstream core packet switch 55. On the reception of the packet of the command to collect the statistics data obtained by monitoring, the core packet switch 55 sends this packet to a further downstream packet switch and the command to collect the statistics data eventually arrives at the most downstream edge packet 54. Upon the reception of the packet including the obtained statistics data, the core packet switch 55 incorporates the locally obtained statistics data by monitoring into this packet and sends the packet to a downstream packet switch. Finally, the most downstream edge packet switch 53 receives the packet containing the statistics data obtained by all upstream packet switches along the route for carrying the communication flow, gathers all the statistics data, and sends it to the meter reader of the network management system. Then, the collection of the statistics data on the communication flow is complete. The packet into which core packet switches incorporate locally obtained statistics data may be a discrete IP packet; that is, multiplex statistics data is sequentially stored in this special IP packet. Alternatively, multiplex statistics data may be sequentially stored into the payload area of one of the IP packets constituting the communication flow as part of user data. The detail on how to store multiplex statistics data into a packet will be described later.

Figure 6:
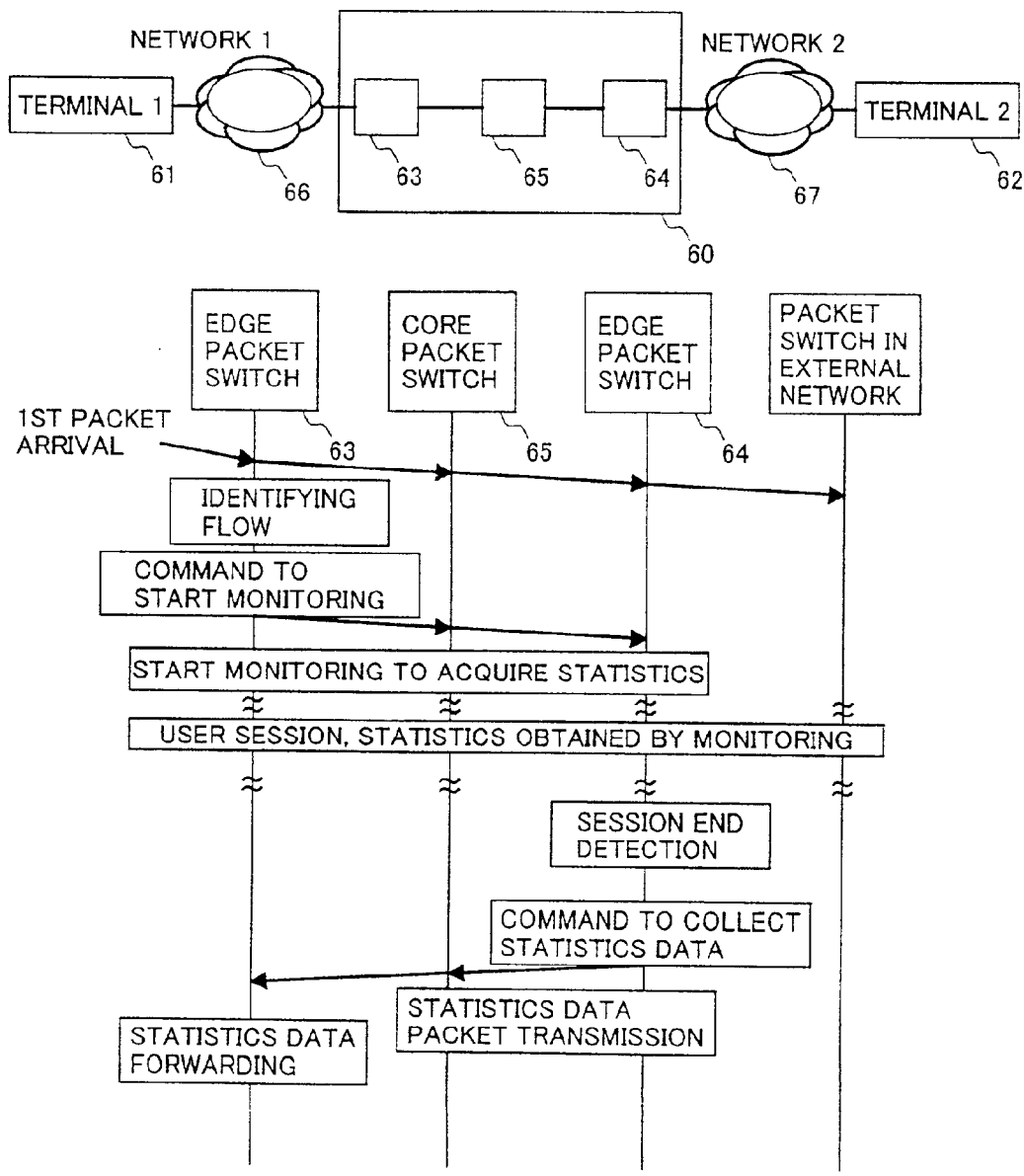
FIG. 6 is a diagram for illustrating an example of modification to the embodiment shown in FIG. 5.

FIG. 6 illustrates an example of modification to the embodiment of the invention illustrated in FIG. 5. The embodiment of the invention illustrated in FIG. 6 differs from that illustrated in FIG. 5 in that the most downstream edge packet switch 64 detects the end (disconnection) of the communication flow. When the edge packet switch 64 detects the end of the communication flow (session), it sends the packet of the command to collect the statistics data obtained by monitoring to the core packet switch 65 connected thereto upstream. The core packet switch 65 sends the packet into which locally obtained statistics data is stored and the packet of the command to collect the statistics data obtained by monitoring toward the upstream edge packet switch 63. Finally, the ultimate upstream edge packet switch 63 gathers all locally obtained statistics data on the communication flow. This edge packet switch 63 sends this data to the meter reader of the network management system. Other details of operation are the same as for the embodiment of the invention illustrated in FIG. 5.

Figure 7:
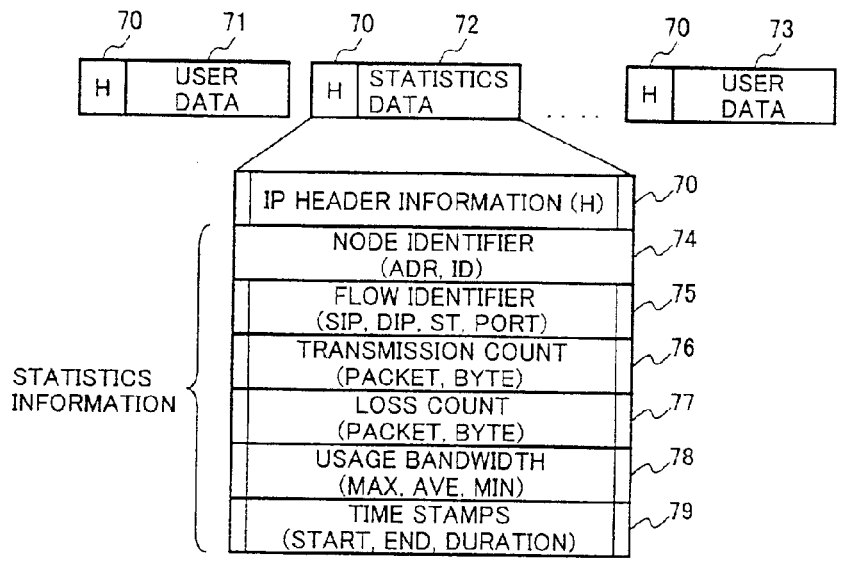
FIG. 7 shows the structure of a packet containing statistics data obtained by monitoring.
Figure 8:
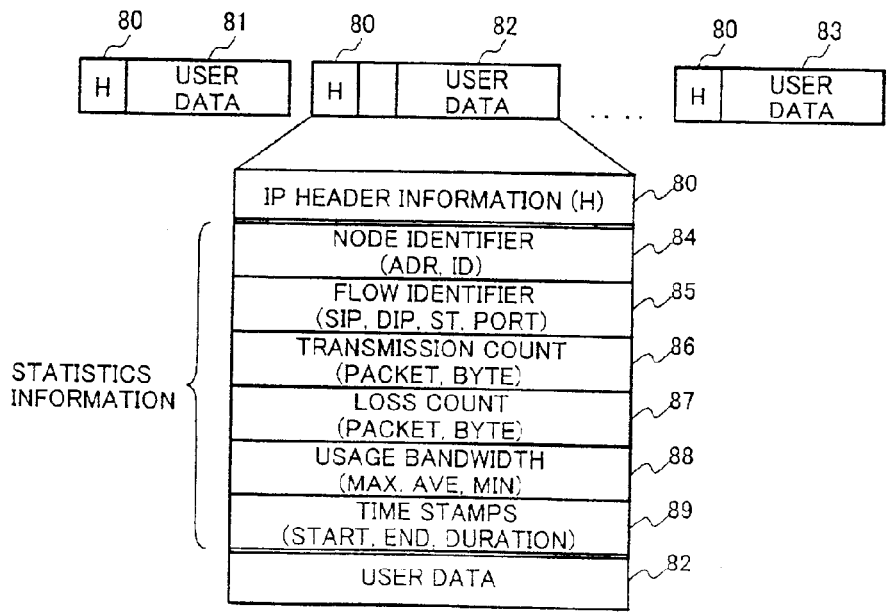
FIG. 8 illustrates an example of modification to the method of incorporating the statistics data into a communication flow, illustrated with reference to FIG. 7.

FIGS. 7 and 8 illustrate how statistics data obtained by monitoring can be stored in a packet to be sent as part of the communication flow.

As an example of how to incorporate statistics data into a communication flow, FIG. 7 illustrates arranging statistics data obtained by monitoring in a discrete IP packet that is inserted between two packets of the IP packets constituting a communication flow for providing terminal-to-terminal communication. As another example, FIG. 8 illustrates arranging statistics data obtained by monitoring and inserting this data between the IP header and the user data in one of the IP packets being transmitted.

In the example presented in FIG. 7, a statistic data transmission packet (consisting of the header 71 and statistics data 72) is assumed to be given the same IP header information 70 and sent as given to the IP packets (consisting of the header 70 and user data 71) being transmitted for terminal-to-terminal transmission. It is easily understandable that the statistics data packet may be sent with the IP header containing the IP address of the packet switch nearest to the sender terminal or the farthest packet switch existing on the other end boundary of the network under traffic observation. This IP address is obtained from routing information stored in the flow table 4 of the packet switch 1 because this table retains the information about the communication route across which the communication flow is carried as the routing information for the communication flow. As explained above with reference to FIG. 1, the packet switch nearest to the sender terminal or the farthest packet switch existing on the other end boundary of the network under traffic observation performs the function to gather the statistics data obtained by monitoring the communication flow to be monitored and send the gathered data to the network management system. Thus, it is advisable to give the IP address of such packet switch as the IP header information to the statistics data packet. Items to be sent as statistics information are stored into locations following the IP header information. These items are a node identifier 74 for identifying the packet switch that acquired the statistics data by monitoring, a flow identifier 75 for identifying the communication flow for which the statistics data was acquired, Transmission Count (Packet, Byte) 76 as the statistics data on the packets transmitted by a packet switch, Loss Count (Packet, Byte) 77 as the data on the number of discarded packets, usage bandwidth 78 information regarding bandwidth used for the packet switch to transmit, and time stamps 79. The above items will be explained in further detail below. As the node identifier, the IP address of the packet switch or the ID number proper to the switch may be used. Because the IP address assigned to the packet switch is unique throughout the network, the packet switch can surely be identified by it. Because a general network managing system often uses the IP addresses of the network components to administrate the network, the use of IP address is harmonized with the addressing scheme when the switch cooperates with the network managing system. As information to be used to identify the flow, the information contained in the IP address header such as Source IP address (SIP), Destination IP Address (DIP), Protocol Type (PT), Service Type (ST), and packet length is used. In addition, Source Port Number and Destination Port Number defined in UDP and TCP layers which are upper than the IP layer may be used. Although communication flow identification by using identifier information defined in upper protocol layers than the IP layer was described up to here, this identification is possible by using header information (Shim header information) defined in layers used in a Multi Protocol Label Switching (MPLS) scheme for which the IETF is lately making efforts toward standardization. Furthermore, if Asynchronous Transfer Mode (ATM) is used as the transmission protocol, flow identifiers such as Virtual Circuit (VC) and Virtual Path (VP) identifiers existing in the ATM header may be used. Any claim of invention based on this fact could easily analogize with the corresponding essence of the present invention.

FIG. 8 illustrates an example of modification of the example presented in FIG. 7. The example of statistics information to be sent as given in FIG. 8 differs from the corresponding example given in FIG. 7 in that the statistics data obtained by monitoring is incorporated into the communication flow in a different way. In the example presented in FIG. 7, the statistics data is stored into the payload area of a separate packet from the packets constituting the communication flow and sent, whereas, in FIG. 8, the statistics data is incorporated into one of the user data packets being transmitted between the terminals. Advantage of the latter method is that the route for carrying the statistics data obtained by monitoring, as indicated by the header of the user data including this data, is exactly the same as the route for carrying other user data packets of the same communication flow. In this way, the statistics data obtained by monitoring can be transmitted as part of the communication flow. In general internets, there is a possibility that packets with different destination IP addresses are transmitted across different routes. According to the above method, however, the header contents of the packet including the statistics data are exactly the same as the header contents (set routing) of the user data packets of the communication flow. This assures that the statistics data obtained by monitoring can be collected in the route across which the monitored communication flow passed.

Figure 9A:
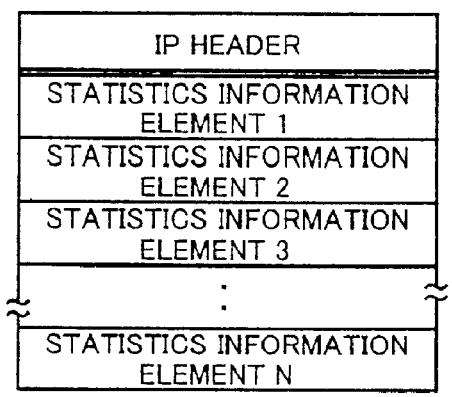
FIG. 9 illustrates how to store multiplex statistics information elements into the statistics data packet or area.
Figure 9B:
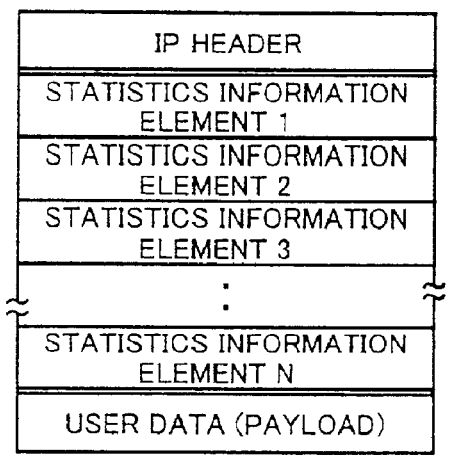
Figure 10:
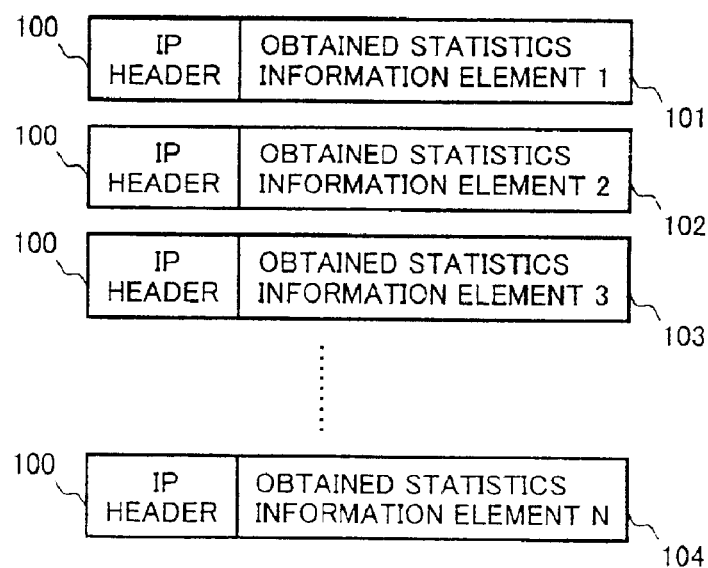
FIG. 10 illustrates a method of sequentially storing multiplex statistics information elements.

FIG. 9 shows the structures of the statistics data packet and the corresponding part of the user data packet containing multiplex statistics data obtained by monitoring and stored by a plurality of packet switches after the packet passed through these switches. A set of the items of statistics data stored per packet switch, explained in the examples presented in FIGS. 7 and 8, is referred to as an statistics information element. FIG. 10 shows the payload (data area) structure of the packet into which packet switches 1 to N sequentially stored the locally obtained statistics information element by adding a new one to the last one.

Figure 11:
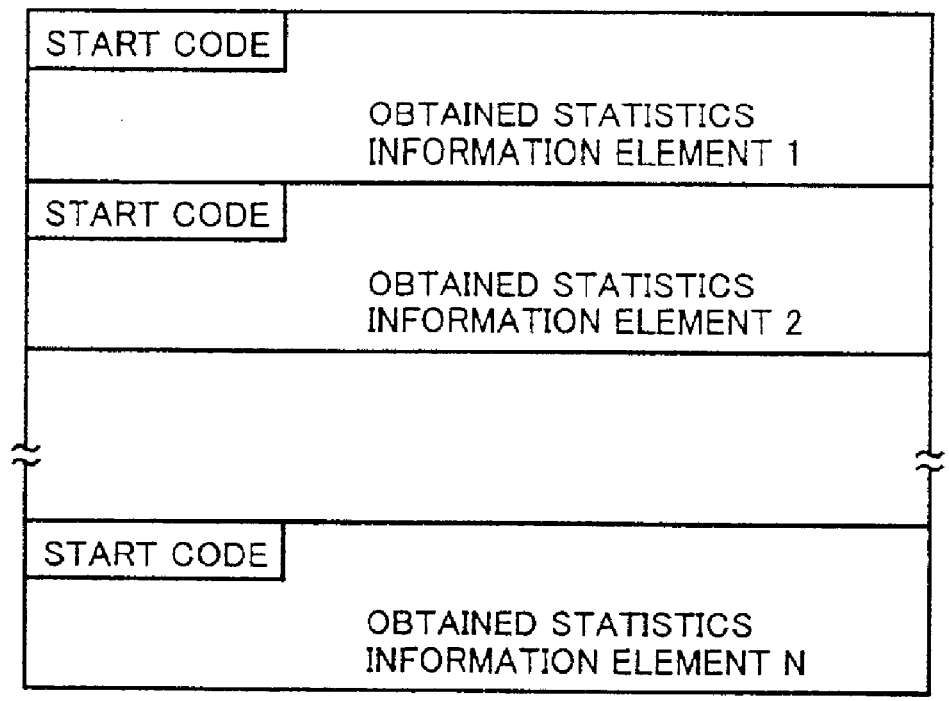
FIG. 11 illustrates an example of modification to the method illustrated in FIG. 10.

Arranging a plurality of statistics information elements in a cascade as shown makes it difficult to detect the boundary between two elements. This structure is modified as shown in FIG. 11 by inserting an element start code between two elements so that the boundary between two statistics information elements can be detected. Moreover, at the beginning of each element, a field is provided in which the size of the element is specified. The start code indicates a location at which each statistics information element begins and individual statistics information obtained per packet switch can be processed. Alternatively, the element size information may be embedded in a statistics information element for element separation purposes: i.e., at the beginning of each element, the element size is specified. Because the element end location can be calculated by adding the element size to the location at which the element begins, element separation is possible in the same way as explained with reference to FIG. 11.

As illustrated in FIG. 10, each statistic information element is added in positional order of the upstream packet switches in series connection when being stored into the statistics data packet or area. This order, however, is not necessarily important because each statistics information element includes the identifier of the packet switch. Adding statistics information in different order can make same result. Any claim of invention based on this fact could easily analogize with the corresponding essence of the present invention.

Next, how the start and end of a communication flow can be detected will be explained below. The flow identifying unit 3 of a packet switch existing on the edge, that is, on either end boundary of the network detects the start and end of a communication flow. As explained with reference to FIG. 1, when the input IF 2 in FIG. 1 receives a packet, the flow identifying unit 3 searches the flow table 4 where the conditions for flow identification are registered in advance, using a search key derived form the packet header. If a condition matching the search key exists in the flow table 4 and there is no history of prior packet reception meeting this condition, the received packet is identified as the first one from which a communication flow begins. The flow identifying unit 3 starts the timer for the communication flow when it detects the first IP packet of the communication flow and the timer begins to count time increments from the time at which the packet was received. Once the flow identifying unit 3 has detected the first packet of the communication flow, it posts start notification to the MUX control 6. On the reception of the start notification, the MUX control 6 generates a packet of the command to start monitoring and statistics acquisition and sends this packet together with user data packets to the adjoining packet switch placed downstream. As mentioned above, the flow identifying unit starts the timer when it detects a new IP packet. After the start of the timer, the value registered on the timer is reset when another IP packet that belongs to the same communication flow is detected. Thus, packet reception and timer reset are repeated alternately as long as a communication flow continues. The flow identifying unit 3 is provided with the timer value monitoring function. When the timer value increments up to a predetermined value, the flow identifying unit 3 judges that the reception of the IP packets of the communication flow has terminated and activates processing on timeout. The processing on timeout mainly comprises sending a packet of the command to collect the statistics data obtained by monitoring to the adjoining packet switch placed downstream. As described above, by the action of the flow identifying unit, the start and end of the communication flow to be monitored can be detected and monitoring and statistics collection can be performed by following the procedure illustrated in FIGS. 5 and 6. The statistics collection may also be performed periodically.

The foregoing embodiment of the present invention is summarized as follows. One edge packet switch existing on either end boundary (edge) of the network under traffic observation detects the start of a communication flow and issues the command to start monitoring and statistics acquisition to all packet switches along the path for carrying the new communication flow. The edge packet switch also detects the end (disconnection) of the communication flow and issues the command to collect the statistics data obtained by monitoring. Each packet switch stores the locally obtained statistics data into the statistics data packet or area which is incorporated into the communication flow and sent to the edge packet switch on the other end of the network. The statistics data thus gathered on the edge packet switch is sent to the meter reader. The main point of the present invention comprises acquiring statistics data by monitoring for each communication flow and gathering such data on one edge packet switch from which the data is sent to the meter reader as described above.

Although only one edge node in the network under traffic observation 30 sends the gathered statistics data obtained by monitoring to the meter reader in the foregoing description of the embodiment of the invention, the invention may also be embodied by dividing the above network 30 into a plurality of management domains and applying the monitoring and statistics collection explained above to each domain.

Then, how an ISP provides service by making use of the present invention will be described below. Assume that the ISP administrates the network under traffic observation 30 shown in FIG. 3. In addition, assume that the terminal of a user whom the ISP contracted for SLA is directly connected to the edge node 33. In the network in FIG. 3, statistics data obtained by monitoring for each communication flow can be collected as explained above. If the SLA defines delay time, minimum bandwidth within which reliable transmission is guaranteed, and a packet loss rate, the IPS can prove its fulfillment of the SLA to the user by collecting the above-mentioned statistics data, Transmission Count (Packet, Byte) 76 as the data on the packets transmitted by a packet switch, Loss Count (Packet, Byte) 77 as the data on the number of discarded packets, usage bandwidth 78 information regarding bandwidth used for the packet switch to transmit, and time stamps 79, which can be acquired per each communication flow, and sending these data items as is or data generated, based on these data items to the user.

According to the present invention, when a communication flow passes across the network under traffic observation, the network management system can collect the statistics data obtained by monitoring from either of the two edge packet switches, one of which one user terminal that is sending the communication flow is connected to and the other of which the other user terminal that is receiving the communication flow is connected to, not from all packet switches in the network. Thus, the invention provides advantage that the traffic for collecting the statistics data can be reduced considerably. The invention also provides great advantage that the statistical analysis load can be reduced because statistics data obtained by monitoring for each communication flow can be collected, which makes it unnecessary to analyze communication flow transmission performance data on a flow-by-flow basis.

The present invention is not limited to the above embodiments and various changes and modifications can be made within the spirit and scope of the present invention. Therefore, to appraise the public of the scope of the present invention, the following claims are made.

What is claimed is:

1. In a method of monitoring a network which comprises a plurality of packet switches and a network management system for managing the packet switches, a packet switch placed on one end boundary of the network, performing the following steps:

detecting the start of communication in packets constituting a communication flow to be monitored by looking up a condition matching with the data contained in the header of incoming packets from among the pre-registered conditions for identifying communication flows to be monitored;

starting to acquire statistics data on the identified communication flow to be monitored when detecting the start of communication in the packets constituting the communication flow to be monitored; and on the occasion when said switch detects the end of the communication in the packets constituting said identified communication flow to be monitored, sending a packet partially including the locally obtained statistics data to the adjoining packet switch placed downstream in the route across which the packets constituting said identified communication flow to be monitored have passed and commanding said adjoining packet switch to collect the statistics data on said identified communication flow to be monitored, locally obtained by said adjoining packet switch.

2. The method of monitoring a network according to claim 1, wherein:

said packet partially including the locally obtained statistics data belongs to said identified communication flow to be monitored.

3. The method of monitoring a network according to claim 1, wherein:

said condition out of said pre-registered conditions for identifying communication flows to be monitored includes at least either the source address/destination address or service type contained in the packet header.

4. The method of monitoring a network according to claim 1, wherein:

said statistics data on said identified communication flow to be monitored includes at least one of the number of packets constituting said communication flow to be monitored that passed through said packet switch, the count of bytes of the packets constituting said communication flow to be monitored that passed through said packet switch, the number of discarded packets of the packets constituting said communication flow to be monitored, and the number of packets constituting said communication flow to be monitored that passed through said packet switch per unit time.

5. In a method of monitoring a network which comprises a plurality of packet switches and a network management system for managing the packet switches, a packet switch placed in the core of the network, performing the following steps:

detecting the start of communication in packets constituting a communication flow to be monitored by looking up a condition matching with the data contained in the header of incoming packets from among the pre-registered conditions for identifying communication flows to be monitored;

starting to acquire statistics data on the identified communication flow to be monitored when detecting the start of communication in the packets constituting the communication flow to be monitored; and on the occasion when said packet switch receives the packet partially including the statistics data collected by the packet switch through which the packets constituting said communication flow to be monitored have passed and which is placed on the one end boundary of said network, incorporating the locally obtained statistics data into said packet received and sending said packet to the adjoining packet switch placed downstream in the route across which the packets constituting said identified communication flow to be monitored have passed.

6. The method of monitoring a network according to claim 5, wherein:

said packet received belongs to said identified communication flow to be monitored.

7. The method of monitoring a network according to claim 5, wherein:

said condition out of said pre-registered conditions for identifying communication flows to be monitored includes at least either the source address/destination address or service type contained in the packet header.

8. The method of monitoring a network according to claim 5, wherein:

said statistics data on said identified communication flow to be monitored includes at least one of the number of packets constituting said communication flow to be monitored that passed through said packet switch, the count of bytes of the packets constituting said communication flow to be monitored that passed through said packet switch, the number of discarded packets of the packets constituting said communication flow to be monitored, and the number of packets constituting said communication flow to be monitored that passed through said packet switch per unit time.

9. In a method of monitoring a network which comprises a plurality of packet switches and a network management system for managing the packet switches, a packet switch placed on the other end of the network, performing the following steps:

detecting the start of communication in packets constituting a communication flow to be monitored by looking up a condition matching with the data contained in the header of incoming packets from among the pre-registered conditions for identifying communication flows to be monitored;

starting to acquire statistics data on the identified communication flow to be monitored when detecting the start of communication in the packets constituting the communication flow to be monitored; and on the occasion when said packet switch receives the packet partially including the statistics data collected by the packet switches through which the packets constituting said communication flow to be monitored have passed and which are placed on the one end boundary of said network and in the core of said network respectively, incorporating the locally obtained statistics data into said packet received and sending said packet to said network management system.

10. The method of monitoring a network according to claim 9, wherein:

said packet received belongs to said identified communication flow to be monitored.

11. The method of monitoring a network according to claim 9, wherein:

said condition out of said pre-registered conditions for identifying communication flows to be monitored includes at least either the source address/destination address or service type contained in the packet header.

12. The method of monitoring a network according to claim 9, wherein:

said statistics data on said identified communication flow to be monitored includes at least one of the number of packets constituting said communication flow to be monitored that passed through said packet switch, the count of bytes of the packets constituting said communication flow to be monitored that passed through said packet switch, the number of discarded packets of the packets constituting said communication flow to be monitored, and the number of packets constituting said communication flow to be monitored that passed through said packet switch per unit time.

13. In a method of monitoring a network which comprises a plurality of packet switches and a network management system for managing the packet switches, a packet switch placed on one end boundary of the network, performing the following steps:

detecting the start of communication in packets constituting a communication flow to be monitored by looking up a condition matching with the data contained in the header of incoming packets from among the pre-registered conditions for identifying communication flows to be monitored;

starting to acquire statistics data on the identified communication flow to be monitored when detecting the start of communication in the packets constituting the communication flow to be monitored; and on the occasion when said switch detects the end of the communication in the packets constituting said identified communication flow to be monitored, sending a packet partially including the locally obtained statistics data to the adjoining packet switch placed upstream in the route across which the packets constituting said identified communication flow to be monitored have passed and commanding said adjoining packet switch to collect the statistics data on said identified communication flow to be monitored, locally obtained by said adjoining packet switch.

14. The method of monitoring a network according to claim 13, wherein:

said packet partially including the locally obtained statistics data belongs to said identified communication flow to be monitored.

15. The method of monitoring a network according to claim 13, wherein:

said condition out of said pre-registered conditions for identifying communication flows to be monitored includes at least either the source address/destination address or service type contained in the packet header.

16. The method of monitoring a network according to claim 13, wherein:

said statistics data on said identified communication flow to be monitored includes at least one of the number of packets constituting said communication flow to be monitored that passed through said packet switch, the count of bytes of the packets constituting said communication flow to be monitored that passed through said packet switch, the number of discarded packets of the packets constituting said communication flow to be monitored, and the number of packets constituting said communication flow to be monitored that passed through said packet switch per unit time.

* * * * *